3,083,567
WELL LOGGING METHOD
Luther C. Cronberger and James M. Reid, Tulsa, Okla., assignors to The Dow Chemical Company, Midland, Mich., a corporation of Delaware
Filed July 5, 1960, Ser. No. 40,787
7 Claims. (Cl. 73—154)

This invention relates to earth well logging operations and particularly to induced temperature rise logging along the bore of an earth well.

For many years measurements of geothermal gradients and their variations have been used in use to solve a variety of oil and gas field problems, particularly in well logging.

Temperature logs have often proven inconclusive in regard to correlation with lithology because temperature variations along the well bore were too small to be accurately distinguished or could not be controlled for optimum resolution by thermal instruments.

Examples of prior art temperature logging include logs in which the native heat of earth formations are measured; logs showing temperature decreases along the well bore after cold fluids are circulated in the bore-hole and/or into the earth formations, or logs showing selective temperature increases after the circulation of heated fluids in the bore-hole to heat the adjacent formation.

Logging the natural temperature of the formation requires, of course, that the well must have reached equilibrium with respect to temperature. In addition, wells may have unnatural temperature differentials due to circulation of fluids.

Accordingly, a principal object of this invention is to provide an improved method of logging the temperature along a well bore as a function of adjacent lithology.

Another object of this invention is to provide an improved, more definitive temperature logging method than has heretofore been obtainable.

In accordance with this invention large amounts of electric current are injected into earth formations through the casing or other metal liners of a well bore and making contact with the earth formation either directly or through cement or other filling between the casing and well bore. Depending on their electrical resistivity more or less current will flow into each stratum penetrated by the bore-hole. As a result the temperature of each stratum adjacent to the well bore will rise by an amount which is square function of the leakage current passing through each stratum. The temperature along the well bore is then measured and plotted to provide a temperature log which is interpreted as are resistivity logs in relation to the adjacent lithology.

Figure 1:
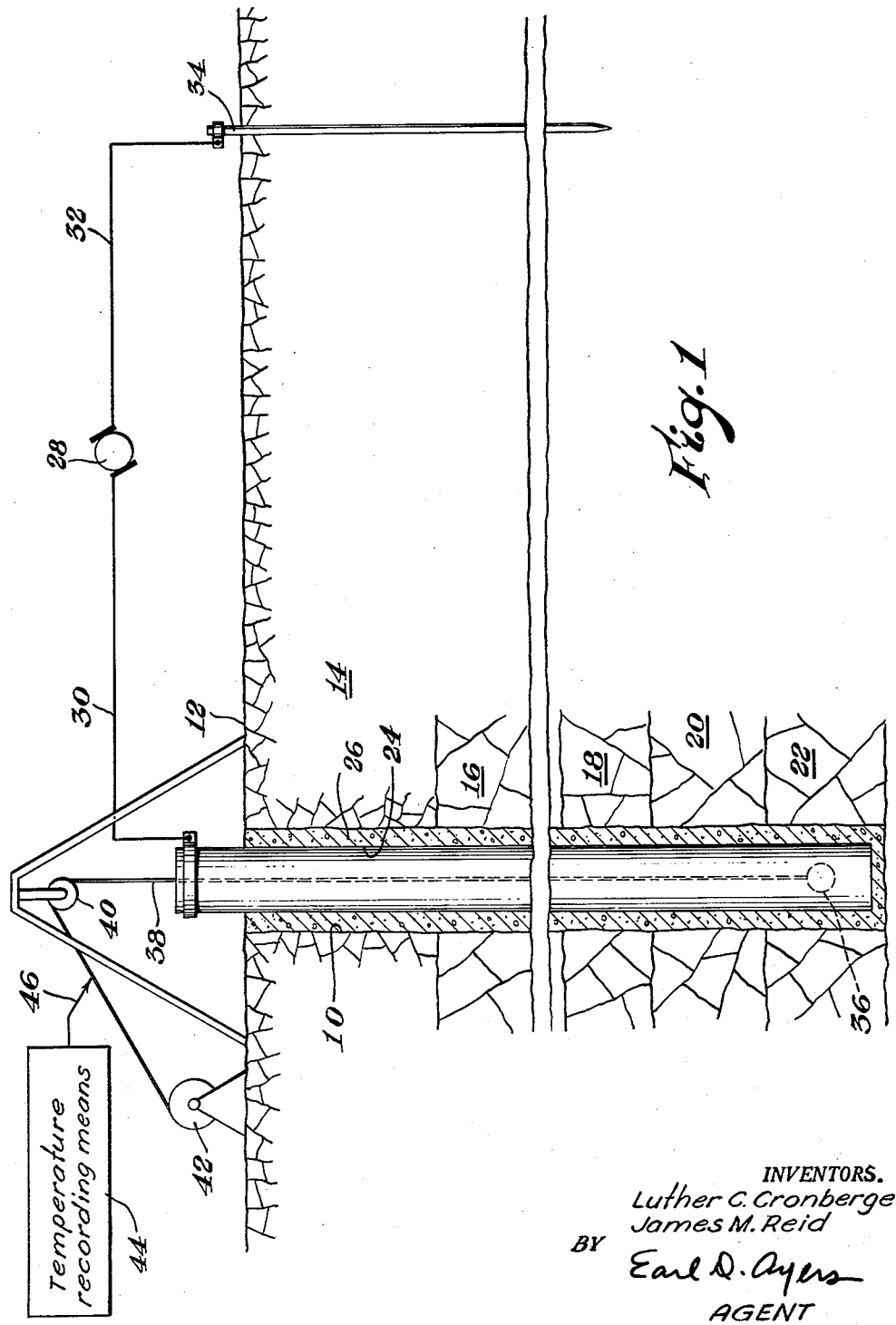
Figure 2:
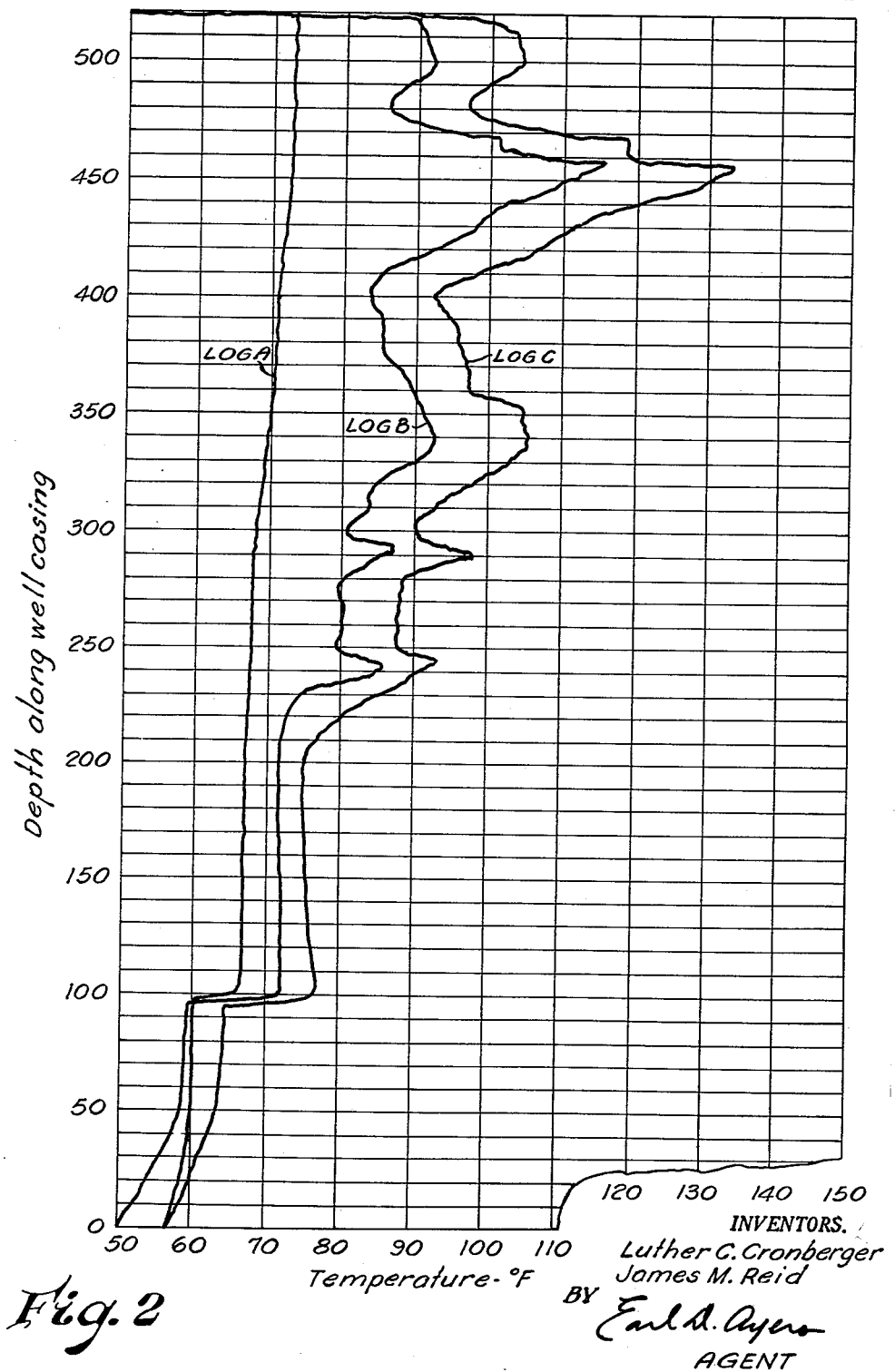

The invention, as well as additional objects and advantages thereof, will best be understood when the following detailed description is read in connection with the accompanying drawing in which:

FIGURE 1 shows, in diagrammatic form, partly in section, a cased bore-hole connected to electrical energizing apparatus in a manner adapted to use in practicing this invention, and FIGURE 2 is a graph showing temperature logs made by lowering a temperature sensitive tool along a bore-hole and continuously recording temperature readings for the length of the bore-hole.

Referring to FIGURE 1, there is shown a bore-hole 10 which extends from the surface 12 of the earth through a number of earth formations 14, 16, 18, 20, 22. A string of casing 24, disposed in the well bore 10, is cemented in place by the cement sheath 26.

An electrical generator 28 is connected by means of the leads 30, 32 to the casing 24 and to a remote ground electrode 34, respectively. A temperature recording instrument 36 is suspended in the well bore 10 on a cable 38 which passes over a sheave 40 at the surface and onto a suitable draw works 42. The cable 38 has insulated electrical conductor means for transmitting to the surface electrical indications of the temperature adjacent to the instrument 36. Temperature recording apparatus 44 is electrically coupled through the lead 46 to the cable 38 and is adapted to utilize the electrical signal output of the instrument 36 to control a recording device in conventional manner.

In operation the temperature sensing instrument is passed along the bore-hole (preferably filled with fluid through those formations in which logging is to take place) and the normal or pre-treatment temperature log of the well bore is noted. Such a log is shown as log A on FIGURE 2 where the well being logged has a total depth of 519 feet. The well contained fluid up to the 95 foot level. Thus, when log A was run the temperature measuring tool 36 was in air for the first 95 feet and the temperature indicated to this depth was about 60° Fahrenheit. (In FIGURE 2 the base line represents the 50° temperature level.)

At the 95 foot level (where fluid was encountered and the temperature was stable) the temperature was about 58° F. and gradually increased in accordance with the normal gradient of temperature of the earth, reaching 73° F. at the bottom of the well.

After the initial log, log A, is taken, with the leads 30, 32 connected between the casing 24 and a remote ground electrode 34 respectively, a direct current of 1100 amperes at 255 volts from the generator 28 was applied for a two hour period.

The casing 24, in the instant example, is preferably connected to the negative terminal of the generator 28 to avoid corrosion problems in connection with the casing which might occur if the casing were to be connected to the positive terminal of the generator. The remote electrode 34 was spaced 330 feet from the well bore 10 and the electrical resistance, as measured between the two electrodes, was .232 ohm.

After applying current between the well 10 and the remote electrode for two hours, the well bore temperature was again logged. Log B shows the temperature existing along the well bore at that time. It may be seen that the temperature had increased throughout the entire length of the casing 24 which contained fluid. In the depths between 100 and about 225 feet the temperature rose about 5° F. At greater depths the temperature rises were even more pronounced, reaching a maximum at about 458 feet where the temperature was found to be about 116° F.

About one hour was required to run log B. Immediately afterward, a two hour additional application of electrical power was made under the same conditions as described before.

Log C was then run to determine the effect of the second two hour application of power upon the temperature measured along the well bore. Increases in temperature were noted, the greatest increases being at the same depths as recorded on log B. The amount of temperature increase, however, was not as great as occurred during the first two hour application of power. This would be expected in view of the fact that with a higher temperature gradient the loss of heat to the surrounding formation would be greater. The hottest place was again at the 458 foot level where the reading was now 134°.

It appears that sufficient power must be applied to heat any particular conductive formation to a temperature above that of its electrically non-conductive (or less conductive) neighbor to such a degree that the induced heat will not be dissipated before a temperature log can be run. The application of currents of from ¾ ampere to 4 amperes per foot of energized casing for from one to five hours have proven practicable. Direct, alternating, or pulsed current may be used, bearing in mind that the heating is a time function and that, because of this, there appears to be no advantage in heating with pulsed current.

Likewise, overheating must be avoided as flow of heat from a too hot formation to cooler, non-conductive formations will result in the non-conductive formations appearing conductive. A long period of time between heating and temperature logging has an effect similar to overheating.

While in most instances the electrical connection to the well being logged is made at the surface, the connection may be made at other points along the casing by running an insulated conductor down the casing and electrically connecting the casing to the conductor (as by means of a packer) at the desired contact location. Making the electrical connection to the casing at a down hole point often is advantageous, especially in deep well logging operations, if strongly conductive formations are encountered near the bottom of the well.

A variation in making the electrical connection down hole is to separate the casing at a point above the point where the electrical connection to the casing is to be made in order that only a section of the casing in the entire well be utilized as the well electrode. Obviously the casing could be separated below the point of electrical contact of the conductor if only a section of casing were to be used as an electrode.

Cutting or separation may be accomplished by mechanical cutting, hydraulic jetting, explosive cutting, chemical cutting or other suitable means.

Since the heating of the formation adjacent to the well bore varies in accordance with the electrical resistivity along the well bore, the log of well bore temperature is interpreted similarly to resistivity logs in correlating temperature to adjacent lithology. Thus, greater temperature rises will occur, for example, in brine saturated strata than in relatively non-conductive petroleum or gas saturated strata.

The temperature measuring instrument may be a resistance thermometer or a thermo-couple device which is enclosed in a hermetically sealed housing and is adapted to be drawn through a liquid column or it may be a wiper-type instrument which makes contact with the surface of the casing and provides an indication of the temperature gradient along the casing.

What is claimed is:

1. A method of logging the bore hole of an earth well having metal casing therein, comprising connecting said casing to one terminal of a source of electrical energy, connecting a remote electrode disposed in electrical contact with the earth at least several feet from said bore hole to another terminal of said source of electrical energy, the two terminals being at different potential levels, applying electrical energy between said casing and said remote electrode at a rate of between ½ ampere and 4 amperes per each foot of casing to which current is applied for between one and five hours and then measuring the temperature gradient along the well bore.

2. A method in accordance with claim 1, wherein said casing is cemented to said well bore along the strata through which the log is to be made.

3. A method in accordance with claim 1, wherein said bore hole is filled with a non-electrically conductive fluid when said temperature gradient is measured.

4. A method in accordance with claim 1, wherein the casing is connected to the negative terminal of an electrical energy source.

5. A method in accordance with claim 1, wherein the applied current per foot of energized casing is at least two amperes and the time of application is at least two hours.

6. A method according to claim 3 in which the temperature measurement is made of the electrically non-conductive fluid.

7. A method of logging the bore hole of an earth well which comprises passing electric current between said bore hole and a remote electrode which is disposed in electrical contact with the earth at least several feet from said bore hole in an amount sufficient to raise the temperature of the adjacent formations and then recording the temperature rise along the part of the well from which said current was passed and wherein the applied current is sufficient to raise the temperature along the casing to which the current is applied by a minimum peak of two degrees Fahrenheit within two hours.

References Cited in the file of this patent

UNITED STATES PATENTS

| | | |
|---|---|---|
| 2,290,075 | Schlumberger | July 14, 1942 |
| 2,311,757 | Jakosky | Feb. 23, 1943 |
| 2,366,694 | Bender | Jan. 9, 1945 |
| 2,414,899 | Rust | Jan. 28, 1947 |
| 2,676,489 | Basham | Apr. 27, 1954 |